L. G. FLEMING.
WHEEL RIM.
APPLICATION FILED DEC. 31, 1914.
1,208,122. Patented Dec. 12, 1916.
2 SHEETS—SHEET 1.
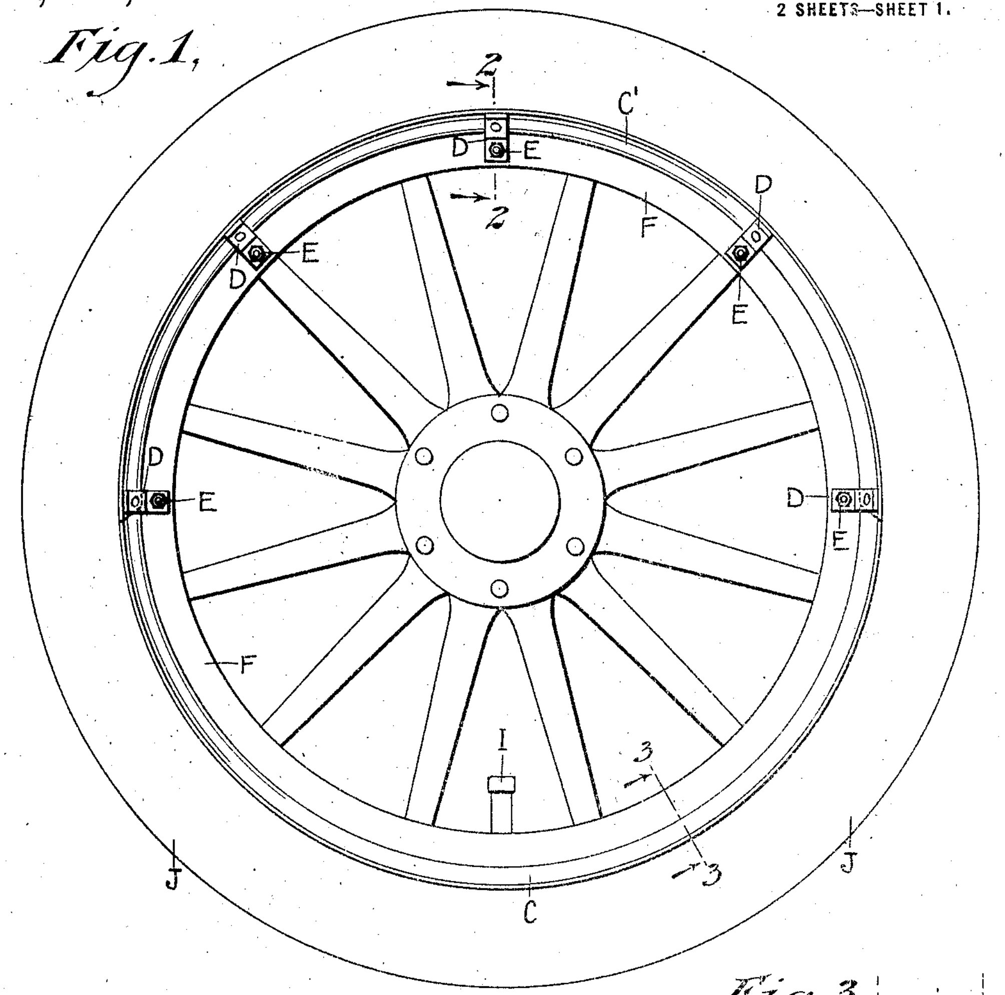
Fig. 1,
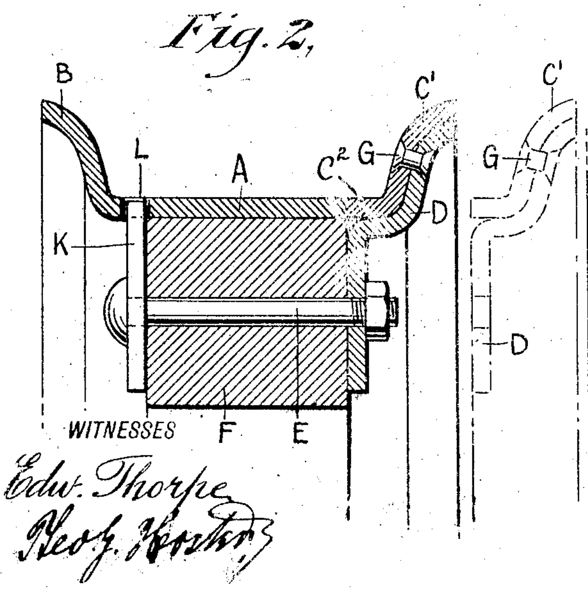
Fig. 2,
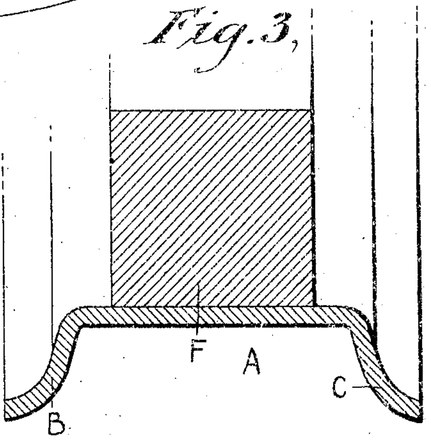
Fig. 3,
WITNESSES
Edw. Thorpe
Geo. J. Koster
INVENTOR
Luke G. Fleming
BY Munn & Co
ATTORNEYS L. G. FLEMING.
WHEEL RIM.
APPLICATION FILED DEC. 31, 1914.
1,208,122. Patented Dec. 12, 1916.
2 SHEETS—SHEET 2.
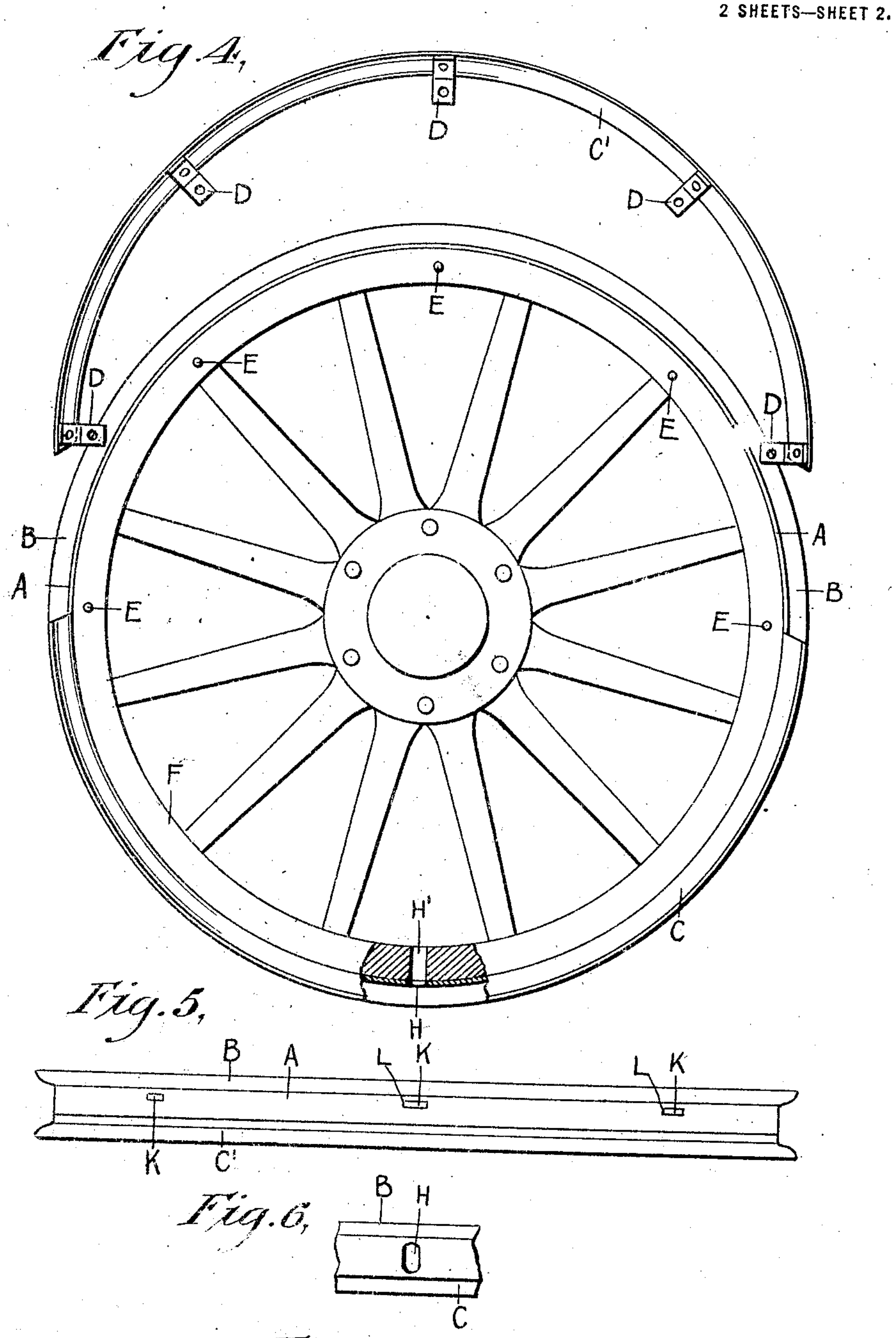
Fig. 4, Fig. 5, Fig. 6,
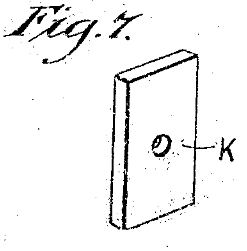
Fig. 7.
WITNESSES:
Edw. Thorpe
Geo. J. Hooper
INVENTOR
Luke G. Fleming
BY Munn & Co
ATTORNEY

UNITED STATES PATENT OFFICE.

LUKE G. FLEMING, OF TARRYTOWN, NEW YORK.

WHEEL-RIM.

1,208,122. Specification of Letters Patent. Patented Dec. 12, 1916.

Application filed December 31, 1914. Serial No. 879,893.

*To all whom it may concern:*

Be it known that I, LUKE G. FLEMING, a citizen of the United States, and a resident of Tarrytown, in the county of Westchester and State of New York, have invented new and useful Improvements in Wheel-Rims, of which the following is a full, clear, and exact description.

The invention relates to wheels of automobiles and other vehicles, and its object is to provide certain new and useful improvements in wheel rims whereby provision is made for quick and convenient removal or replacement of the tire.

In order to accomplish the desired result, use is made of a rim consisting of a ring having an integral inner flange and an outer flange, of which a portion is integral with the ring and the other portion is detachably connected with the felly of the wheel.

A practical embodiment of the invention is represented in the accompanying drawings forming a part of this specification, in which similar characters of reference indicate corresponding parts in all the views.

Figure 1 is a face view of an automobile wheel provided with the rim; Fig. 2 is an enlarged cross section of the same on the line 2—2 of Fig. 1; Fig. 3 is a similar view of the same on the line 3—3 of Fig. 1; Fig. 4 is a face view, partly in section, of the automobile wheel, with the tire omitted and the detachable or separable portion of the rim detached; Fig. 5 is a plan view of the same with the detachable flange portion in position; Fig. 6 is a plan view of a portion of the rim showing the elongated hole for the valve stem; and Fig. 7 is a perspective view of one of the retaining members for holding the rim against accidental movement on the felly.

The rim is approximately channel shape in cross section and consists of a rim ring A, an integral inner flange B and an outer flange having a portion C integral with the ring A and having a sector-shaped portion C′ separable from the integral portion C. The detachable portion C′ is provided with a number of brackets D extending inwardly and fastened by bolts E to the felly F of the wheel, and on which felly fits the ring A of the rim, as will be readily understood by reference to Figs. 2 and 3. The brackets D are preferably fastened by rivets G to the detachable sector portion C′ of the outer flange, and the brackets D are preferably placed equal distances apart with a bracket at each end of the detachable rim portion C′, as shown in Fig. 1. The middle of the detachable flange portion C′ is located diametrically opposite the valve stem hole H formed in the ring A and registering with a corresponding aperture H′ in the felly F for the passage of the valve I used for inflating the inner tube of the tire J of usual construction and held on the rim, as indicated in Fig. 1.

When it is desired to place a tire J in position on the rim or to remove it therefrom, it is only necessary for the operator to remove the nuts of the bolts E for the removal of the flange portion C′, as indicated in Figs. 2 and 4. In placing the tire in position, the operator first engages the valve I with the valve stem holes H and H′ and fits the corresponding sides of the tire onto the ring A and then slips the upper portion of the tire over the ring, the removal of the sector portion C′ of the flange permitting such movement of the tire. When the tire has been placed in position on the ring A then the flange portion C′ is replaced and fastened in position by the bolts E.

In order to hold the rim from accidental displacement on the felly F, use is made of retaining members K, each preferably in the form of a plate held on the bolt E and fitting against the rear face of the felly F to serve as a washer for the head of the bolt E. The ring A of the rim is provided with apertures L flush with the inner face of the felly F and into which fit the outer ends of retaining members K abutting against the inner face of the felly so that the rim is held against transverse displacement on the said felly.

From the foregoing it will be seen that the rim is very simple in construction and the operator can quickly remove the separable flange portion C′ from the rim to allow of conveniently removing a tire from the rim or replacing the said tire.

In practice, the flange portions C and C′ are each approximately one-half of the whole outside flange, to allow of conveniently placing the tire in position on the rim or removing it therefrom. The flange portion C′ preferably has a portion $C^2$ of the rim ring A integral therewith, as plainly shown in Figs. 2 and 5, to strengthen the flange. The inner edge of the portion $C^2$ is flush with the outer face of the felly F so that the flange portion C′ can be readily removed. The flange portions are preferably beveled at their ends, as plainly shown in Figs. 1 and 4, so that the ends of the flange portion C do not form sharp corners to prevent injury to the tire when placing the latter in position on the rim or removing it therefrom. It is understood that the inner flange B referred to is the one nearest the vehicle body. It is also understood that the rim ring is preferably shrunk on the peripheral face of the felly in the usual manner.

Having thus described my invention, I claim as new and desire to secure by Letters Patent:

A rim for automobile wheels, comprising a ring having an integral annular inner flange and an outer flange, of which latter approximately one-half portion is integral with the ring and the remaining half portion is separable, brackets on the said separable flange portion, bolts for attaching the said separable flange portion to the felly of the wheel, and retaining washers on the said bolts and engaging apertures in the said ring of the rim, the said apertures being flush with the inner face of the felly and the said retaining washers abutting against the inner face of the felly.

In testimony whereof I have signed my name to this specification in the presence of two subscribing witnesses.

LUKE G. FLEMING.

Witnesses:
THEO. G. HOSTER,
PHILIP D. ROLLHAUS.